US006967731B1

(12) United States Patent
Kizawa

(10) Patent No.: US 6,967,731 B1
(45) Date of Patent: Nov. 22, 2005

(54) MULTIFUNCTION APPARATUS AND DATA PRINTING METHOD

(75) Inventor: Makoto Kizawa, Ueda (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 1001 days.

(21) Appl. No.: 09/604,102

(22) Filed: Jun. 27, 2000

(30) Foreign Application Priority Data

Feb. 18, 2000 (JP) ............................. 2000-041742

(51) Int. Cl.[7] .......................... G06F 3/12; G06F 13/00; H04N 1/21; H04N 1/41; H04N 1/44
(52) U.S. Cl. ............... 358/1.14; 358/1.16; 358/426.05; 358/426.06; 358/404
(58) Field of Search ............................. 358/1.13–1.17, 358/468, 426.01–426.06, 404, 444, 296; 345/502, 501, 716; 382/232

(56) References Cited

U.S. PATENT DOCUMENTS

| 4,727,435 | A | | 2/1988 | Otani et al. | |
|---|---|---|---|---|---|
| 4,855,839 | A | | 8/1989 | Saito | |
| 5,113,494 | A | * | 5/1992 | Menendez et al. | 345/502 |
| 5,208,676 | A | * | 5/1993 | Inui | 358/1.16 |
| 5,611,024 | A | * | 3/1997 | Campbell et al. | 358/1.15 |
| 5,673,119 | A | * | 9/1997 | Murata | 358/468 |
| 5,745,245 | A | * | 4/1998 | Shibata | 358/426.06 |
| 5,805,174 | A | * | 9/1998 | Ramchandran | 345/501 |
| 5,822,463 | A | * | 10/1998 | Yokose et al. | 382/251 |
| 5,854,692 | A | * | 12/1998 | Nakatani | 358/468 |
| 5,974,182 | A | * | 10/1999 | Bryniarski et al. | 382/232 |
| 5,978,097 | A | | 11/1999 | Ueno | |
| 5,984,446 | A | * | 11/1999 | Silverbrook | 347/3 |
| 6,031,624 | A | * | 2/2000 | Murphy | 358/1.17 |
| 6,040,920 | A | * | 3/2000 | Ichiriki | 358/403 |
| 6,070,000 | A | * | 5/2000 | Mori | 358/1.15 |
| 6,124,943 | A | * | 9/2000 | Mitani | 358/1.17 |
| 6,133,912 | A | * | 10/2000 | Montero | 345/716 |
| 6,226,329 | B1 | * | 5/2001 | Ishibashi | 375/240.26 |
| 6,369,907 | B1 | * | 4/2002 | Aoki | 358/1.15 |
| 6,369,909 | B1 | * | 4/2002 | Shima | 358/1.15 |
| 6,480,295 | B1 | * | 11/2002 | Taoda | 358/1.16 |
| 6,577,407 | B1 | * | 6/2003 | Kopecki | 358/1.15 |
| 6,621,588 | B1 | * | 9/2003 | Shimada | 358/1.15 |
| 2001/0024522 | A1 | * | 9/2001 | Nakao | 382/232 |

FOREIGN PATENT DOCUMENTS

| DE | 2339490 | 1/2000 |
|---|---|---|
| EP | 0944238 | 9/1999 |

(Continued)

OTHER PUBLICATIONS

English Language Abstract of JP 11-301058.

(Continued)

Primary Examiner—Scott A. Rogers
(74) Attorney, Agent, or Firm—Greenblum & Bernstein, P.L.C.

(57) ABSTRACT

A multifunction apparatus which has a facsimile communication section configured to conduct a facsimile communication. The multifunction apparatus includes an interface which receives PDL data from a host apparatus, and a controller which obtains image data based on the received PDL data. The multifunction apparatus also includes a compressor which compresses the obtained image data by a compression method utilized for the facsimile communication, and a memory which stores the compressed image data. Further, the controller predicts an amount of the image data compressed by the compressor before storing the compressed image data in the memory, judges whether the predicted amount of the compressed image data can be stored in the memory, and stores the compressed image data in the memory when the predicted amount of the compressed image data can be stored in the memory.

10 Claims, 13 Drawing Sheets

FOREIGN PATENT DOCUMENTS

| | | | | |
|---|---|---|---|---|
| JP | 4-211977 | | 8/1992 | ............ B41J 29/46 |
| JP | 5-201073 | | 8/1993 | ............. B41J 5/30 |
| JP | 06141167 | * | 5/1994 | .......... H04N 1/387 |
| JP | 08207401 | * | 8/1996 | ............ B41J 29/38 |
| JP | 8-307677 | | 11/1996 | .......... H04N 1/403 |
| JP | 08300745 | * | 11/1996 | ............. B41J 5/30 |
| JP | 9-233248 | | 9/1997 | ............. H04N 1/00 |
| JP | 10147016 | * | 6/1998 | ............. B41J 5/30 |
| JP | 11301058 | | 11/1999 | ............ B41J 29/00 |
| WO | 97/ 02542 | | 1/1997 | |

OTHER PUBLICATIONS

English Language Abstract of JP 8-307677.
English Language Abstract of JP 9-233248.
English Language Abstract of JP 5-201073.
English Language Abstract of JP 4-211977.

* cited by examiner

ENCIRCLE THE CORRESPONDING ITEMS BELOW:

| QUESTIONNAIRE SHEET | | | |
|---|---|---|---|
| BIRTHPLACE | AGE | SEX | PRESENT ADDRESS |
| (TOKYO), OSAKA, KYOTO | TWENTIES, (THIRTIES), FORTIES | (MALE), FEMALE | SAME AS BIRTHPLACE, (MOVED) |

NAME :

COMMENT :

FIG. 11

ENCIRCLE THE CORRESPONDING ITEMS BELOW:

QUESTIONNAIRE SHEET

BIRTHPLACE           AGE                       SEX           PRESENT ADDRESS

TOKYO, OSAKA, KYOTO  TWENTIES, THIRTIES, FORTIES  MALE, FEMALE  SAME AS BIRTHPLACE, MOVED

NAME:

COMMENT:

FIG. 12

ENCIRCLE THE CORRESPONDING ITEMS BELOW:

| QUESTIONNAIRE SHEET | | | |
|---|---|---|---|
| BIRTHPLACE | AGE | SEX | PRESENT ADDRESS |
| TOKYO, OSAKA, KYOTO | TWENTIES, THIRTIES, FORTIES | MALE, FEMALE | SAME AS BIRTHPLACE, MOVED |

NAME:

COMMENT:

FIG. 13

ENCIRCLE THE CORRESPONDING ITEMS BELOW:

| QUESTIONNAIRE SHEET | | | |
|---|---|---|---|
| BIRTHPLACE | AGE | SEX | PRESENT ADDRESS |
| (TOKYO), OSAKA, KYOTO | TWENTIES, (THIRTIES), FORTIES | (MALE), FEMALE | SAME AS BIRTHPLACE, (MOVED) |

NAME:

COMMENT:

FIG. 14

ENCIRCLE THE CORRESPONDING ITEMS BELOW:

| QUESTIONNAIRE SHEET | | | |
|---|---|---|---|
| BIRTHPLACE | AGE | SEX | PRESENT ADDRESS |
| (TOKYO), OSAKA, KYOTO | TWENTIES, (THIRTIES), FORTIES | (MALE), FEMALE | SAME AS BIRTHPLACE, (MOVED) |

NAME : _____

COMMENT : _____

FIG. 15

MULTIFUNCTION APPARATUS AND DATA PRINTING METHOD

BACKGROUND OF THE INVENTION

1. Field of the Invention

The present invention relates to a printing apparatus that carries out printing by interpreting a page description language of print data sent from a host apparatus.

2. Description of the Related Art

Conventionally, a printer apparatus as a printing apparatus that carries out printing by interpreting a page description language of print data sent from a host apparatus is connected on a network and prints print data sent from a plurality of host apparatuses. When printing a confidential document, etc. (hereinafter referred to as "secret printing") using such a printer apparatus, a technique is known which prevents printing unless a password is entered from a panel provided on the printer apparatus even if a host apparatus instructs that print data should be printed.

On the other hand, print data sent from a host apparatus to this type of printer apparatus is normally written in a page description language (hereinafter referred to as "PDL data") such as PCL of Hewlett-Packard Company and PostScript of Adobe Systems Inc.

The printer apparatus described above temporarily stores print data sent from the host apparatus in memory of the printer apparatus and waits for a password to be entered before printing the data, and therefore the printer apparatus needs to incorporate memory that can temporarily store the print data. At this time, the print data sent from the host apparatus is written in PDL data. The print data written in this PDL data has a structure with a plurality of layers and the volume of the print data in this case is not predictable from the number of pages, etc. of the print data. Thus, this type of printer apparatus has a problem of requiring bulk memory anticipating a case where large-volume print data is required.

For such memory, a hard disk, etc. is normally used. With bulk memory such as a hard disk, this printer apparatus can perform secret printing. Due to the necessity of bulk memory such as a hard disk, this type of printer apparatus has another problem of increasing the cost of apparatus.

Such problems can also occur in cases other than secret printing. For example, these problems may also occur when a plurality of print data pieces is sent from host apparatuses on a network simultaneously and part or the whole of such print data should be temporarily stored in memory in the printer apparatus.

SUMMARY OF THE INVENTION

It is an object of the present invention to provide a printing apparatus and printing method capable of storing print data sent from a host apparatus in memory in the apparatus without requiring bulk memory. That is, the present invention makes it possible to receive print data from the host apparatus and decide whether or not to store compressed data obtained by compressing image data of the received print data in memory; and if the compressed data should be stored in memory, predict the data volume of the compressed data and decide whether it is possible to store the compressed data of the predicted data volume in memory or not; then, if the compressed data of the predicted data volume can be stored, interpret the page description language of the print data, acquire image data and store the compressed data obtained by compressing the image data in memory. Thus, when storing the received print data in memory, the present invention predicts the data volume of the compressed data of the print data, and if the compressed data of the predicted data volume can be stored in memory, the compressed data of the print data is stored in memory. For this reason, if the compressed data of the print data can be stored in memory, the present invention can store the print data received from the host apparatus in memory of the apparatus without requiring bulk memory.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 11 shows a specific example when the multi-function apparatus according to the embodiment above carries out secret printing;

FIG. 12 illustrates a process of forming PDL data characters using a conventional printer apparatus, etc.;

FIG. 13 illustrates a process of forming a PDL data table using the conventional printer apparatus, etc.;

FIG. 14 illustrates a process of forming PDL data marks (○ mark, etc.) using the conventional printer apparatus, etc.; and FIG. 15 illustrates a process of forming PDL data underlines using the conventional printer apparatus, etc.

DETAILED DESCRIPTION OF THE PREFERRED EMBODIMENTS

With reference now to the attached drawings, embodiments of the present invention will be explained in detail below.

Figure 1:
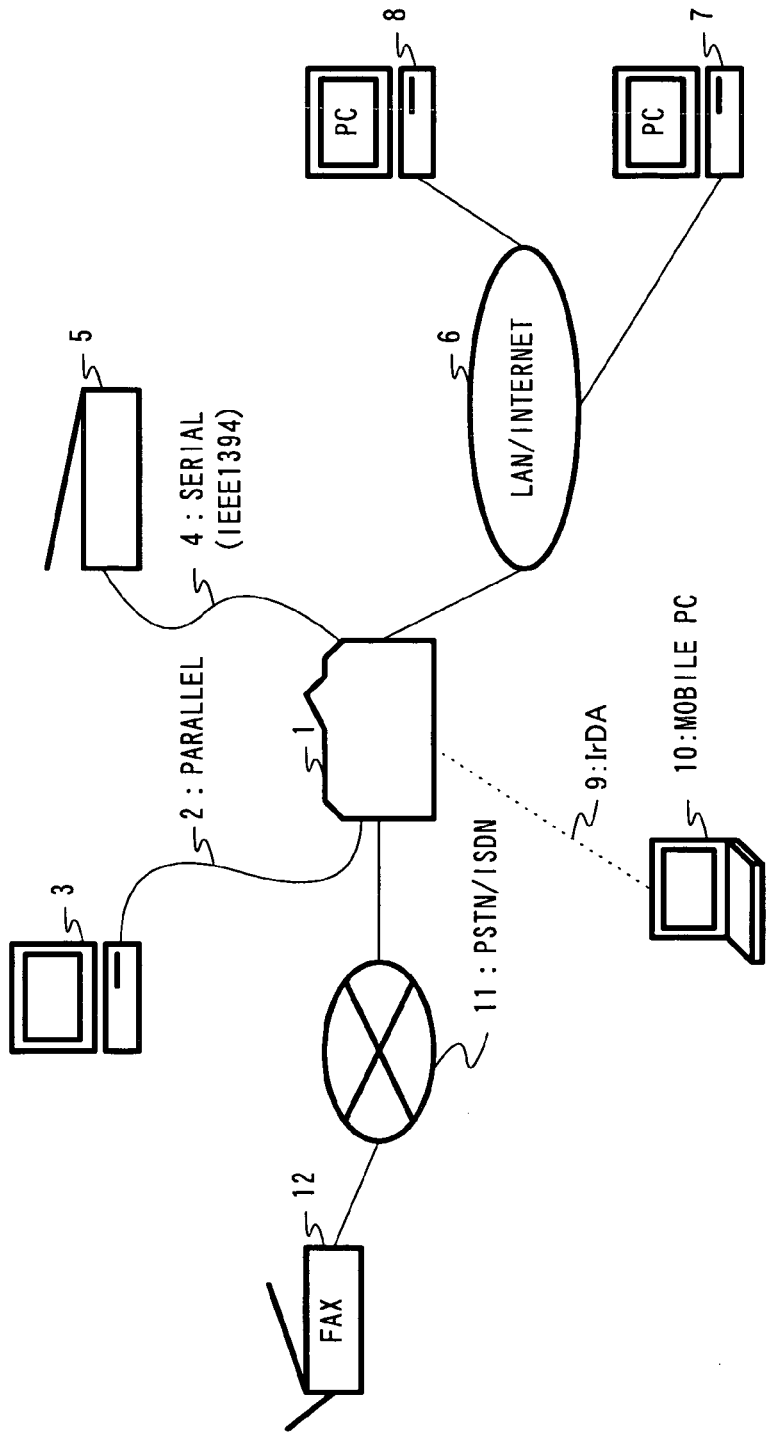
FIG. 1 is a schematic diagram showing a network on which a multi-function apparatus as a printing apparatus according to an embodiment of the present invention operates.

FIG. 1 is a schematic diagram showing a network on which a multi-function apparatus as a printing apparatus according to an embodiment of the present invention operates.

Multi-function apparatus 1 has a function as a recording apparatus such as a printer, a function as a copying apparatus such as a copier and a function as an image communication apparatus such as a facsimile. As an example of use of these functions, FIG. 1 shows a case where multi-function apparatus 1 is connected to a plurality of host apparatuses via a plurality of different transmission paths. That is, multi-function apparatus 1 is connected to a personal computer (hereinafter referred to as "PC") 3 via parallel cable 2. Multi-function apparatus 1 is further connected to scanner (separate type copier) 5 via serial cable 4 such as IEEE1394. Multi-function apparatus 1 is further connected to PC 7 and PC 8 via computer network 6 such as LAN and the Internet. Multi-function apparatus 1 is further connected to mobile PC 10 via a radio communication path such as IrDA-compliant infrared communication path (hereinafter referred to as "IrDA") 9. Multi-function apparatus 1 is further connected to FAX 12 via analog/digital public switched telephone network (hereinafter referred to as "PSTN/ISDN") 11.

This embodiment describes a case where multi-function apparatus 1 has three functions as a recording apparatus, copying apparatus and image communication apparatus. However, the present invention is not limited to this, but the multi-function apparatus of the present invention is also applicable to cases where the multi-function apparatus has any two of the three functions.

Figure 2:
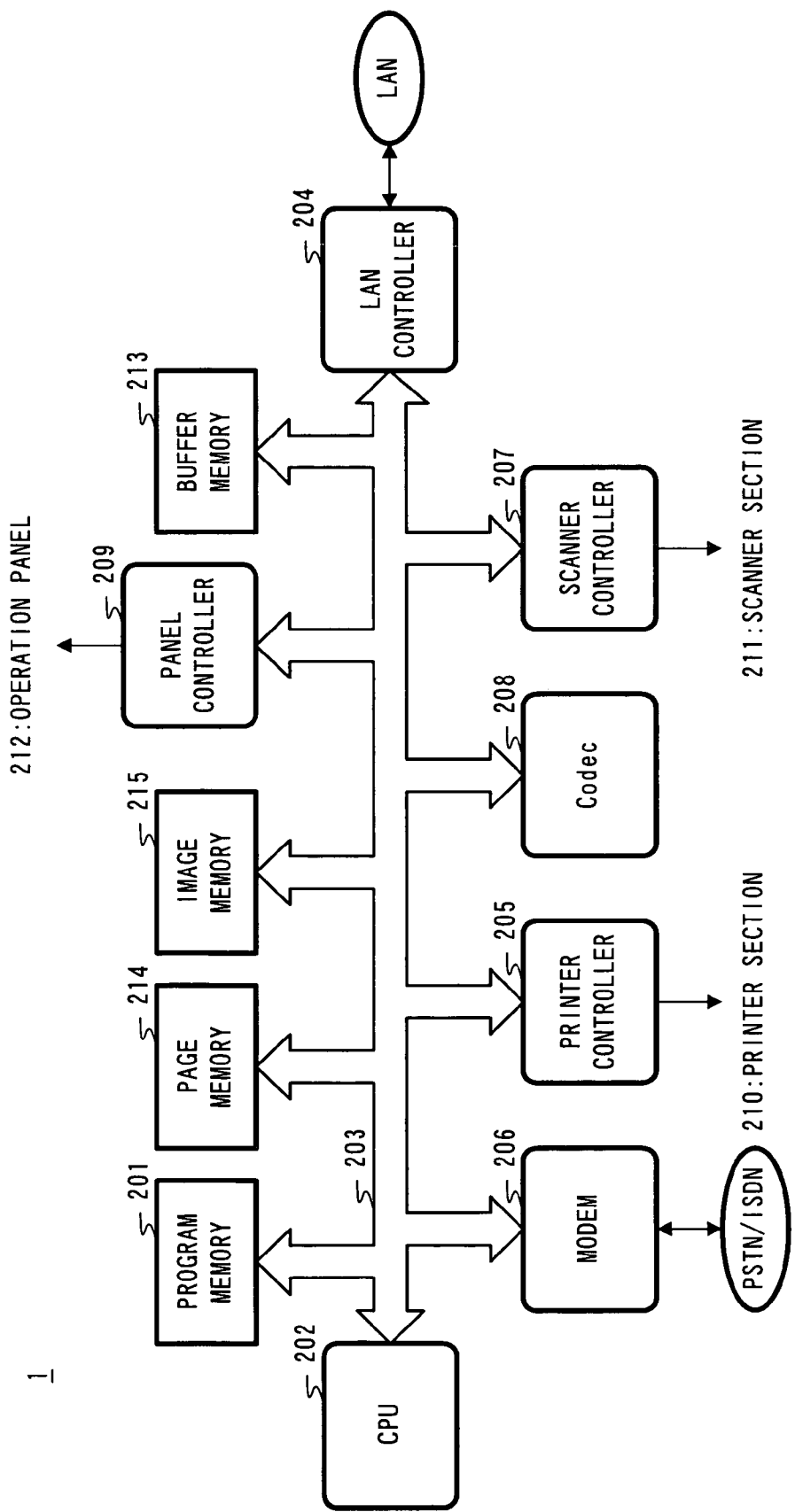
FIG. 2 is an outlined block diagram of the multi-function apparatus according to the embodiment above of the present invention.

FIG. 2 is an outlined block diagram of the multi-function apparatus according to the embodiment of the present invention.

Multi-function apparatus 1 stores programs to implement the functions as the recording apparatus, copying apparatus and image communication apparatus in program memory 201. CPU 202 executes these programs to implement the functions as the recording apparatus, copying apparatus and image communication apparatus.

Program memory 201 also stores a processing program that interprets PDL data of print data sent from a host apparatus (hereinafter referred to as "interpreter processing"). CPU 202 executes this program to interpret PDL data. FIG. 2 shows a case where a single CPU 202 is used, but it is desirable to carry out interpreter processing using a plurality of CPUs 202 to speed up interpreter processing.

CPU 202 is connected, via bus 203, to LAN controller 204, printer controller 205, modem 206, scanner controller 207, coder/decoder (hereinafter referred to as "CODEC") 208 and panel controller 209.

LAN controller 204 is connected to LAN or computer network 6 such as the Internet via LAN and controls data transmission/reception between this multi-function apparatus 1 and computer network 6. This allows multi-function apparatus 1 to carry out data communications with PC 7 connected on LAN or PC 8 installed in a remote place, etc.

Printer controller 205 is connected to printer section 210 and controls data transmission/reception with printer section 210. Under instructions of printer controller 205, printer section 210 prints specified print data. This allows multi-function apparatus 1 to print data through printer section 210.

Modem 206 is connected to PSTN/ISDN 11 and carries out data communications and facsimile communications via PSTN/ISDN 11. This allows multi-function apparatus 1 to carry out facsimile communications with a FAX, etc. installed in a remote place, etc.

Scanner controller 207 is connected to scanner section 211 and controls this scanner section 211. Scanner section 211 scans image data of a document under the control of scanner controller 207.

CODEC 208 encodes or decodes data read from scanner controller 207 or data received from modem 206, etc. CODEC 208 also carries out coding on the image data, which is the print data specified by the host apparatus subjected to interpreter processing and written to a page memory that will be described later, or decoding on the coded image data.

For CODEC 208, for example, a coding/decoding system whose data volume after compression is predictable such as JBIG (Joint Bi-Level Image Experts Group) system or MH (Modified Huffman) system is used. In this embodiment, suppose CODEC 208 carries out coding/decoding in compliance with the JBIG system.

Here, the coding/decoding system whose data volume after compression is predictable is explained taking the JBIG system as an example. "Data volume after compression is predictable" means that it is possible to predict the volume obtained by compressing data with a minimum compression rate.

More specifically, a case where print data with resolution of 600 dpi is printed to an A4 recording sheet is explained. Generally, when coding such print data, it is when a "checkered pattern" is specified as print data that the data compression rate becomes a minimum. Suppose the data volume before coding this "checkered pattern" print data is approximately 2 MB. If this "checkered pattern" is coded according to the JBIG system, the data volume after coding is compressed to approximately $\frac{1}{10}$. In other words, for the compression rate for the above recording sheet, approximately $\frac{1}{10}$ is secured even in the case of data whose print data is the most difficult one to be compressed. That is, the data volume after coding is predicted to be 200 KB. Thus, based on the data volume per one recording sheet when the compression rate is a minimum and the total number of pages of the print data, multi-function apparatus 1 can predict the data volume when the compression rate is a minimum. Normally, a higher compression rate can be expected in the JBIG system, but multi-function apparatus 1 predicts the data volume after coding by only taking into account the minimum compression rate.

Panel controller 209 is connected to operation panel 212. The operator of multi-function apparatus 1 can send predetermined commands from this operation panel 212 to multi-function apparatus 1. Panel controller 209 controls commands or data input from this operation panel 212 with CPU 202. This operation panel 212 is provided with a touch panel for the operator to input the number of copies, facsimile communication destinations addresses, etc. and a display to display them.

CPU 202 is also connected, via bus 203, to buffer memory 213, page memory 214 and image memory 215. These buffer memory 213, page memory 214 and image memory 215 do not have special configurations, but are normal memories to implement functions as a recording apparatus, copying apparatus and image communication apparatus.

Buffer memory 213 temporarily stores data received from computer network 6 of LAN, etc. via LAN controller 204 or data to be transmitted to computer network 6 via LAN controller 204.

Page memory 214 stores image data, which is print data written in PDL data subjected to interpreter processing.

Image memory 215 is divided into a file control area and a data area. The file control area stores secret passwords when carrying out secret printing and total page information, etc. of the print data. The data area stores image data received via modem 206 when carrying out a facsimile communication, image data of a document to be sent from multi-function apparatus 1 or image data of a document scanned by scanner section 211, and stores image data coded by CODEC 208.

Figure 3:
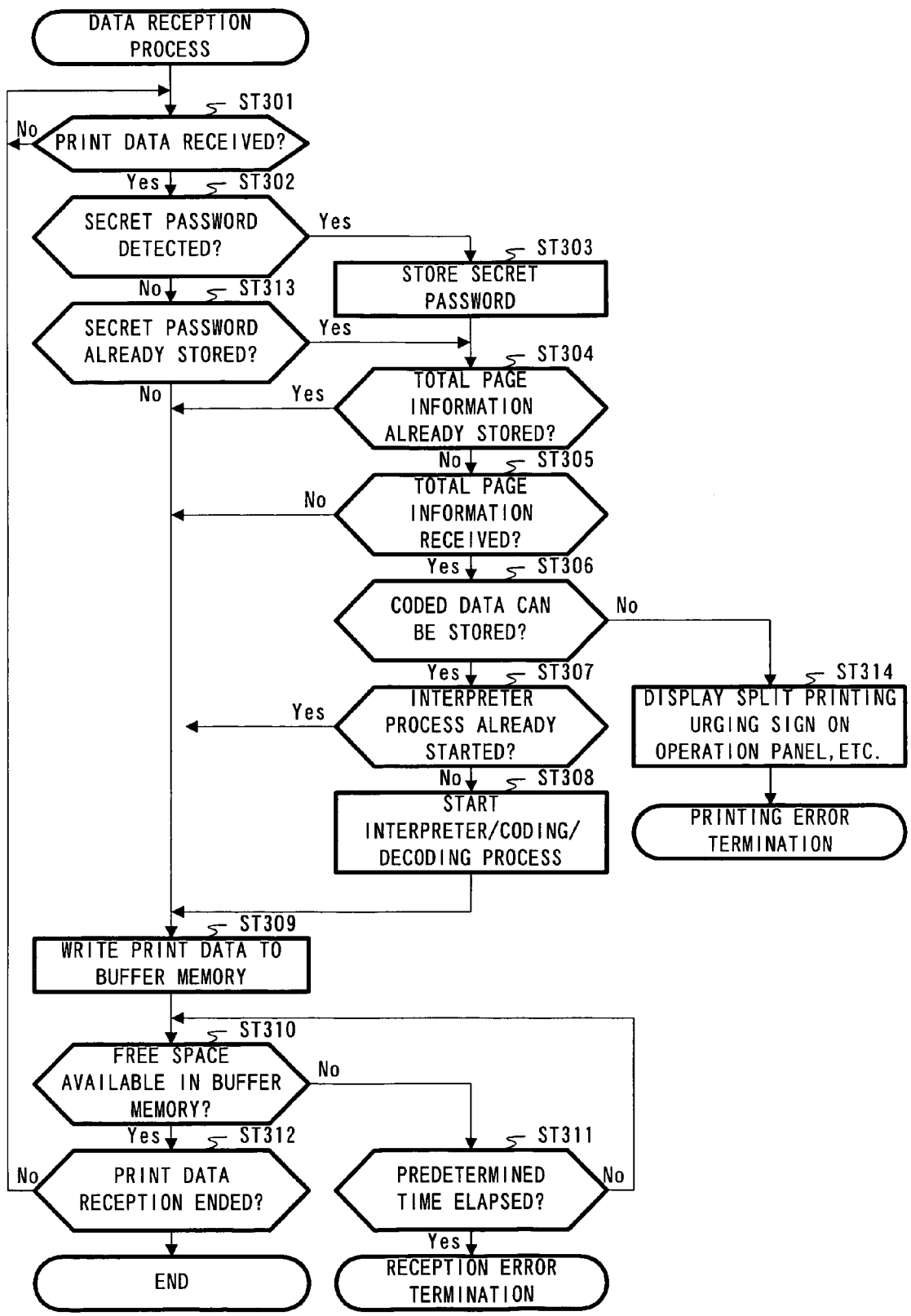
FIG. 3 is a flow chart showing how the multi-function apparatus according to the embodiment above receives print data from a host apparatus.
Figure 4:
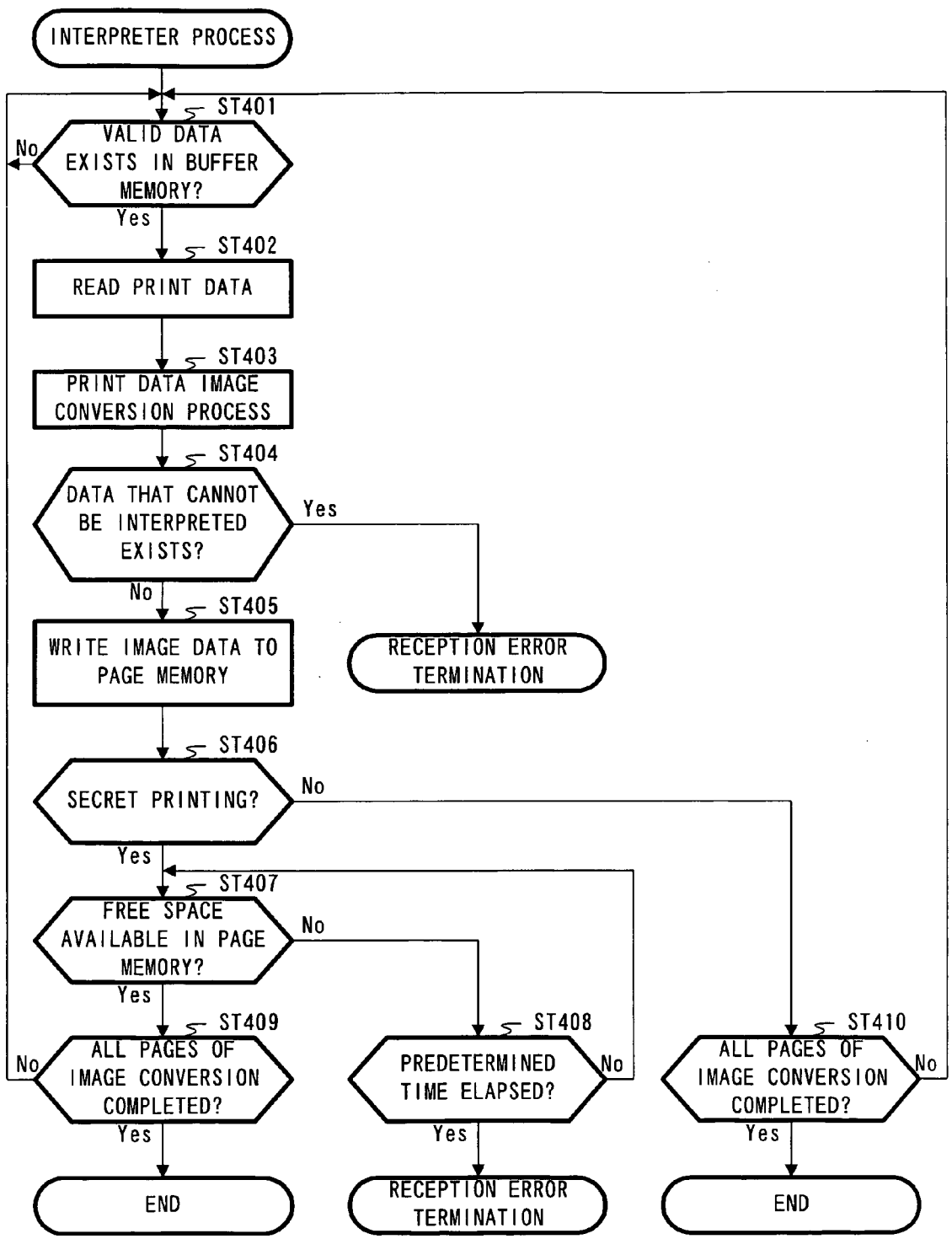
FIG. 4 is a flow chart showing how the multi-function apparatus according to the embodiment above carries out interpreter processing on the received print data.
Figure 5:
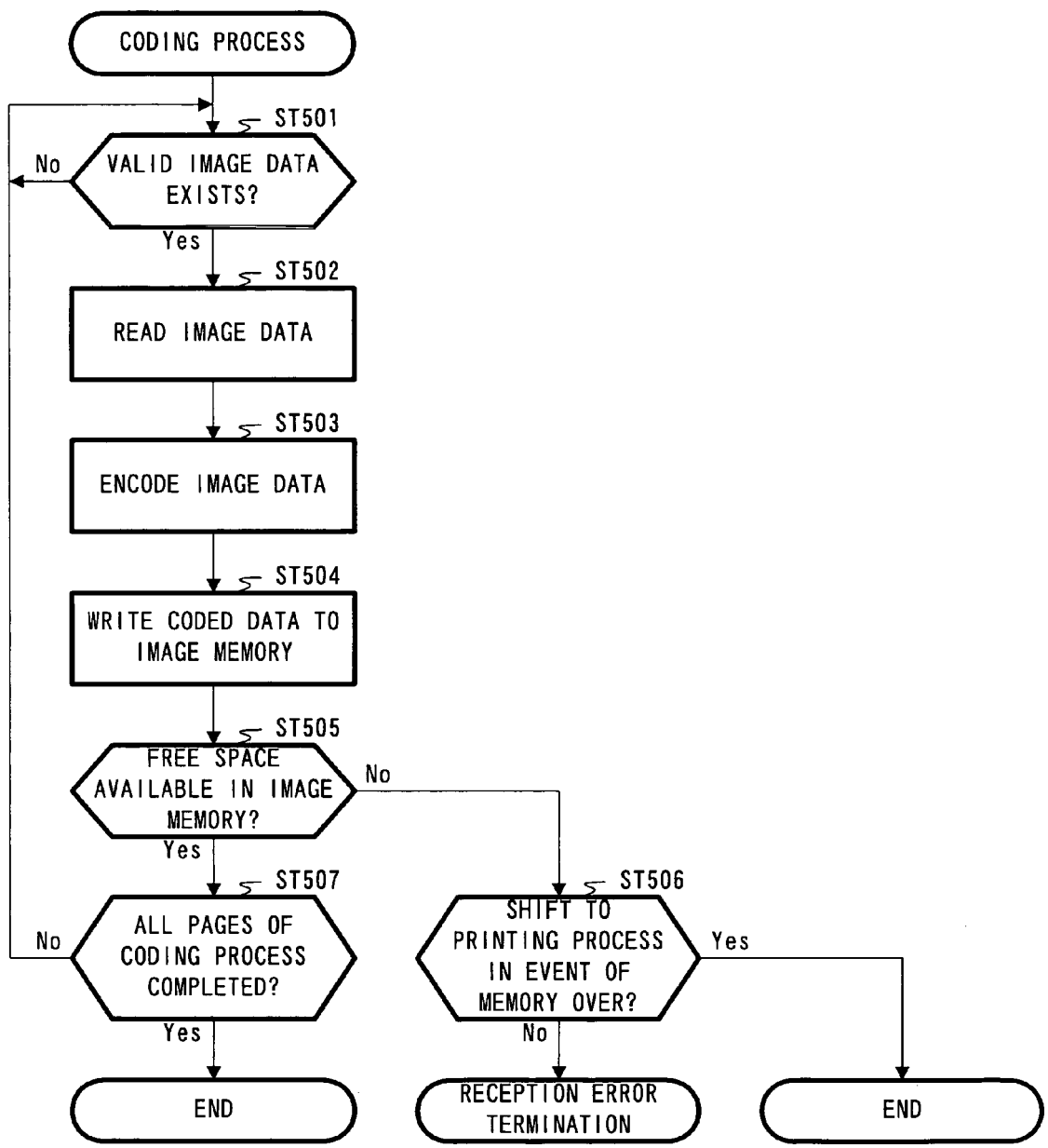
FIG. 5 is a flow chart showing how the multi-function apparatus according to the embodiment above carries out coding on image data subjected to interpreter processing.
Figure 6:
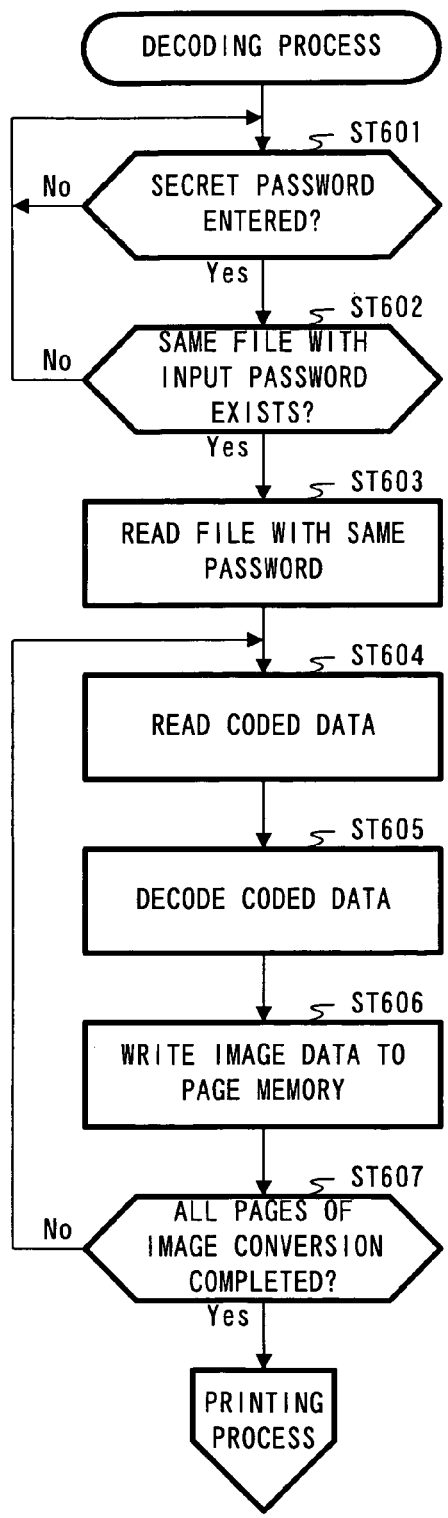
FIG. 6 is a flow chart showing how the multi-function apparatus according to the embodiment above carries out decoding on coded image data.
Figure 7:
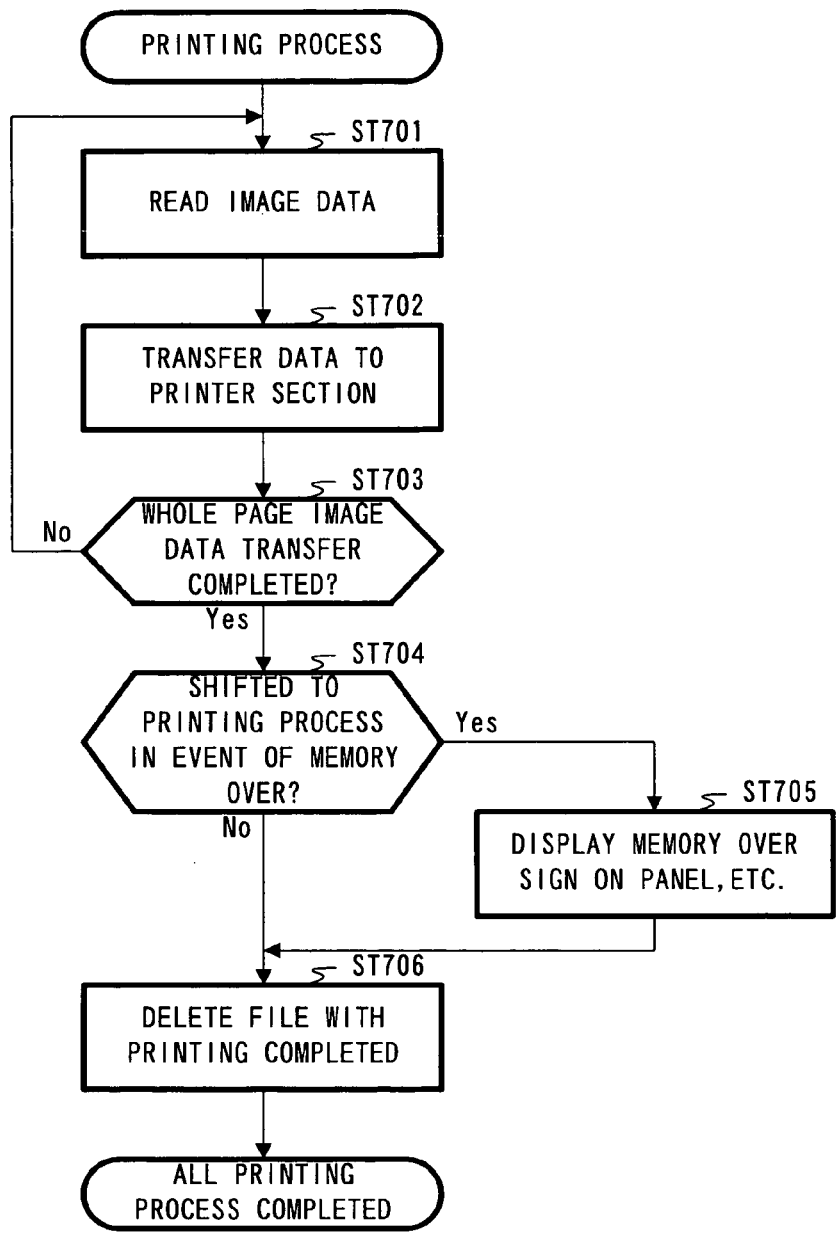
FIG. 7 is a flow chart showing how the multi-function apparatus according to the embodiment above prints image data.

Next, the operation of multi-function apparatus 1 with such a configuration when secret printing is instructed from a host apparatus connected on LAN is explained using FIG. 3 to FIG. 7. FIG. 3 illustrates a flow of multi-function apparatus 1 receiving print data from the host apparatus. FIG. 4 illustrates a flow of multi-function apparatus 1 carrying out interpreter processing on the received print data. FIG. 5 illustrates a flow of multi-function apparatus 1 coding the image data subjected to interpreter processing. FIG. 6 illustrates a flow of multi-function apparatus 1 decoding the coded image data. FIG. 7 illustrates a flow of multi-function apparatus 1 printing the image data.

First, the flow of multi-function apparatus 1 receiving print data from a host apparatus is explained using FIG. 3.

Normally, multi-function apparatus 1 is monitoring reception of a command from the host apparatus. When secret printing is commanded from the host apparatus, multi-function apparatus 1 receives print data via LAN controller 204 (ST 301). The print data consists of a header section and a data section.

The header section contains job information of this print data. In this case, the job information of the print data includes a message stating that this print data is secret printing, a password used for secret printing (hereinafter referred to as "secret password"), total page information of the print data and size of recording sheets, etc. On the other hand, the data section includes PDL data printed by this secret printing. This PDL data includes fonts and their point numbers for printing.

Upon reception of this print data, CPU 202 first carries out reception processing of the header section of the print data. CPU 202 analyzes the header section of the print data and decides whether the header section includes a secret password (ST 302). In this way, CPU 202 can decide the next processing based on the information included in the header section of the print data. In this case, secret printing is specified from the host apparatus and this header section includes a secret password. For this reason, CPU 202 detects the secret password. CPU 202 stores the detected secret password in the file control area in image memory 215 (ST 303).

After storing this secret password, CPU 202 decides whether the total page information is stored in the file control area (ST 304). Since the total page information is not stored in the file control area yet, CPU 202 shifts processing to ST 305. Then, CPU 202 decides whether the total page information included in the header section has been received or not (ST 305). Upon reception of the total page information, CPU 202 stores the received total page information in the file control area of image memory 215.

After storing the total page information, CPU 202 decides whether image memory 215 has a free space enough to store data of a volume predicted based on the size of the recording sheet to which the print data is printed and the corresponding minimum compression rate according to the JBIG system (ST 306). Thus, since it is decided whether image memory 215 has a free space enough to store data of a volume predicted based on the total page information, the size of the recording sheet to which the print data is printed and the corresponding minimum compression rate according to the JBIG system, it is possible to correctly decide whether data can be stored in image memory 215 or not. Here, suppose a free space enough to store predicted data exists in image memory 215.

To explain more specifically using the above example, if 5 pages of print data with resolution of 600 dpi are printed to A4 recording sheets, CPU 202 decides whether image memory 215 has a space enough to store 1 MB data corresponding to the 5 pages, predicting that a data volume of 2 MB per one page can be compressed to $\frac{1}{10}$.

If CPU 202 decides that there is a free space to store the predicted data in image memory 215, CPU 202 decides whether interpreter processing has already been started or not (ST 307). Here, since the interpreter processing has not been started yet, CPU 202 starts interpreter processing and coding/decoding processing (ST 308). This starts interpreter processing and coding/decoding processing that will be described later in parallel with reception of print data.

Next, CPU 202 writes the received print data to buffer memory 213 (ST 309). At this time, CPU 202 decides whether buffer memory 213 has some free space (ST 310). If buffer memory 213 does not have enough free space, CPU 202 repeats the decision in ST 310 until a predetermined time elapses. If the predetermined time has elapsed without enough free space in buffer memory 213 (ST 311), CPU 202 displays a print data reception error on the display of operation panel 212 and ends the reception processing on the print data.

On the other hand, if three is a free space in buffer memory 213, CPU 202 decides whether reception of all print data has been completed (ST 312) or not. Here, since only the header section of the print data has been subjected to reception processing, CPU 202 shifts processing to ST 301.

Then, CPU 202 carries out reception processing on the data section of the print data. Upon reception of the data section of the print data (ST 301), CPU 202 decides whether the data section includes a secret password or not as in the case of the reception process of the header section (ST 302). However, since the data section includes no secret password, CPU 202 shifts processing to ST 313.

Then, CPU 202 decides whether any secret password is stored in the file control area (ST 313). Here, since a secret password has already been stored in the file control area, CPU 202 decides whether any total page information is stored in the file control area (ST 304). Here, since the total page information is stored in the file control area, CPU 202 shifts processing to ST 309.

Then, CPU 202 writes the received print data to buffer memory 213 as in the case of reception processing of the header section (ST 309). At this time, CPU 202 carries out the processes in ST 310 to ST 312 as in the case of the reception processing of the header section.

Furthermore, in the process in ST 312, CPU 202 repeats the processes in ST 301 to ST 312 until it is decided that the reception of all print data is completed. Then, in the process in ST 312, if CPU 202 decides that the reception of all print data is completed, CPU 202 ends the print data reception process.

In the process in ST 306, if CPU 202 decides that there is not a free space to store the predicted volume of data in image memory 215, CPU 202 displays a sign prompting split printing of the print data on the display of operation panel 212 (ST 314) and ends the print data reception process.

Next, the flow of multi-function apparatus 1 carrying out interpreter processing of the received print data is explained using FIG. 4. Interpreter processing of print data is carried out when a valid image data is stored in buffer memory 213.

When carrying out interpreter processing of print data, CPU 202 first decides whether valid print data exists in buffer memory 213 or not (ST 401). Here, since valid print data exists in buffer memory 213, CPU 202 reads the print data from buffer memory 213 (ST 402). If, in ST 401, valid print data does not exist in buffer memory 213, CPU 202 repeats the process in ST 401.

After reading the print data from buffer memory 213, CPU 202 carries out a process of converting print data to image data (hereinafter referred to as "image conversion process") (ST 403). The print data image conversion process is carried out by interpreting PDL data included in the data section of the print data. Interpreting the PDL data causes the PDL data to be converted to image data.

When carrying out the image conversion process, CPU 202 decides whether there is any PDL data that cannot be interpreted (ST 404). If there is some PDL data that cannot be interpreted, CPU 202 displays a print data reception error on the display of operation panel 212 and ends the print data interpreter process.

If there is no PDL data that cannot be interpreted, CPU 202 writes image data to page memory 214 (ST 405).

At this time, CPU 202 decides whether printing of the received print data is secret printing or not by deciding whether a secret password is stored in the file control area or not (ST 406). Here, since the secret password is stored in the file control area of image memory 215, CPU 202 decides that printing of the received print data is secret printing.

When writing image data to page memory 214, CPU 202 decides whether there is any free space in page memory 214 (ST 407). If there is not enough free space in page memory 214, CPU 202 repeats the decision in ST 407 until a predetermined time elapses. If the predetermined time has elapsed without enough free space in page memory 214 (ST 408), CPU 202 displays a print data reception error on the display of operation panel 212 and ends the interpreter process of the print data.

On the other hand, if three is enough free space in page memory 214, CPU 202 decides whether image conversion of all pages of print data has been completed (ST 409) or not. Here, suppose the image conversion process has not been completed for all pages of the print data.

Since the image conversion process has not been completed for all pages of the print data, CPU 202 shifts processing to ST 401. Then, CPU 202 repeats the processes in ST 401 to ST 409 until image conversion is completed for all pages of the print data. Then, in the process in ST 409, if CPU 202 decides that image conversion has been completed for all pages of the print data, CPU 202 ends the print data image conversion process.

Here, in the process in ST 406, if CPU 202 decides that printing of the received print data is not secret printing, CPU 202 carries out the processes in ST 407 and ST 408 (not shown in the figure) as in the case of secret printing and decides whether image conversion of all pages of print data has been completed or not (ST 410).

Then, in ST 410, if CPU 202 decides that image conversion of all pages of print data has not been completed, CPU 202 repeats the processes in ST 401 to ST 406 and ST 410 until the image conversion processing on all pages of print data is completed. On the other hand, if CPU 202 decides that the image conversion processing on all pages of print data has been completed, CPU 202 ends the print data image conversion process.

Figure 8:
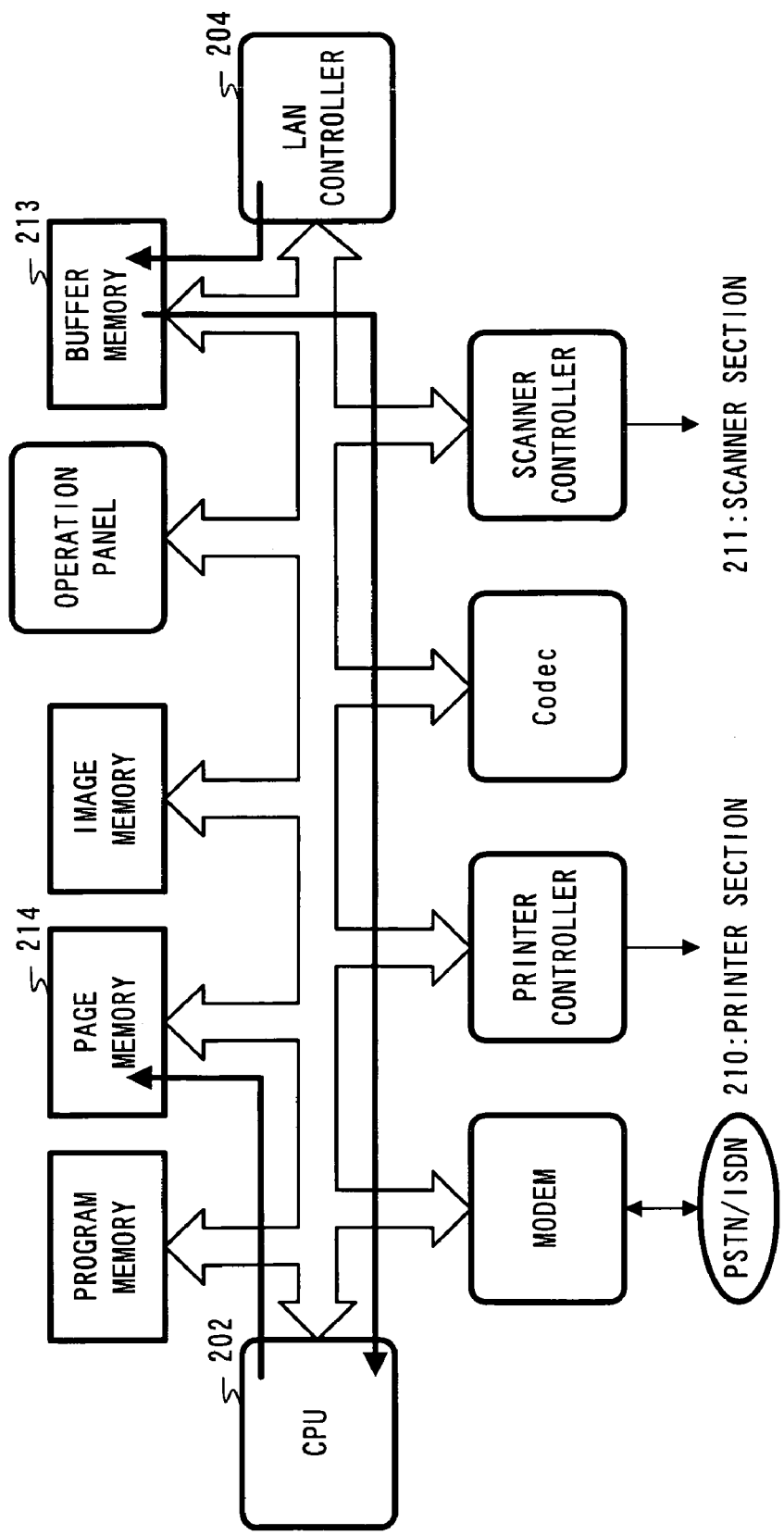
FIG. 8 illustrates a flow of print data when the multi-function apparatus according to the embodiment above carries out reception processing and interpreter processing on print data.

FIG. 8 illustrates a flow of print data when carrying out the above print data reception process and interpreter process. AS shown in FIG. 8, the print data received from LAN controller 204 is passed to CPU 202 via buffer memory 213. CPU 202 carries out interpreter processing on this print data and converts this print data to image data. Then, CPU 202 stores the converted image data in page memory 214.

Then, the flow of multi-function apparatus 1 coding the image data subjected to interpreter processing is explained using FIG. 5. Coding processing on image data is carried out when it is decided in ST 406 that printing of the received print data is secret printing.

When carrying out the coding processing on image data, CPU 202 first decides whether valid image data exists in page memory 214 or not (ST 501). Here, since valid image data exists in page memory 214, CPU 202 reads the image data from page memory 214 (ST 502). If, in ST 501, valid image data does not exist in page memory 214, CPU 202 repeats the process in ST 501.

After reading the image data from page memory 214, CPU 202 carries out coding processing on image data (ST 503). The image data coding process is carried out by CODEC 208 according to the JBIG system. At this time, the coded image data (hereinafter referred to as "coded data") is compressed more than the volume of the image data before coding.

After carrying out the image data coding process, CPU 202 writes the coded data to image memory 215 (ST 504). At this time, CPU 202 decides whether enough free space exists in image memory 215 (ST 505). The coded data is written as a file corresponding to the secret password stored in the file control area in ST 303.

Here, if there is not enough free space in image memory 215, CPU 202 decides whether or not to shift to a printing process in the event of memory over (ST 506). More specifically, CPU 202 decides whether or not to shift to a printing process in the event of memory over by displaying a message indicating memory over on the display of operation panel 212 to decide the input from the operator or by deciding whether processing is preset to shift to a printing process in the event of memory over.

However, since it is decided in the decision in ST 306 during the print data reception process that image memory 215 has an enough space for the print data, ST 506 is unlikely to result in memory over. However, considering the case where image memory 215 is consumed by the facsimile communication, copy or other functions during this print data process, CPU 202, in ST 506, decides whether or not to shift to a printing process in the event of memory over.

If processing is not shifted to the printing process, CPU 202 displays a print data reception error on the display of operation panel 212 and ends the print data coding process. On the other hand, if processing is shifted to the printing process, CPU 202 writes the coded data to image memory 215 as much as possible and then ends the print data coding process and waits for a command to subject the coded data to a decoding process.

On the other hand, if an enough free space exists in image memory 215, CPU 202 decides whether the coding processing on all pages of the image has been completed or not (ST 507). Here, suppose the coding processing on all pages of the image data has not been completed yet.

Because the coding processing on all pages of the image data has not been completed, CPU 202 shifts processing to ST 501. Then, CPU 202 repeats the processes in ST 501 to ST 507 until the coding processing on all pages of the image data is completed. Then, if it is decided that the coding processing on all pages of the image data has been completed in the process in ST 507, CPU 202 ends the print data coding process and waits for a command to subject the coded data to a decoding process.

Figure 9:
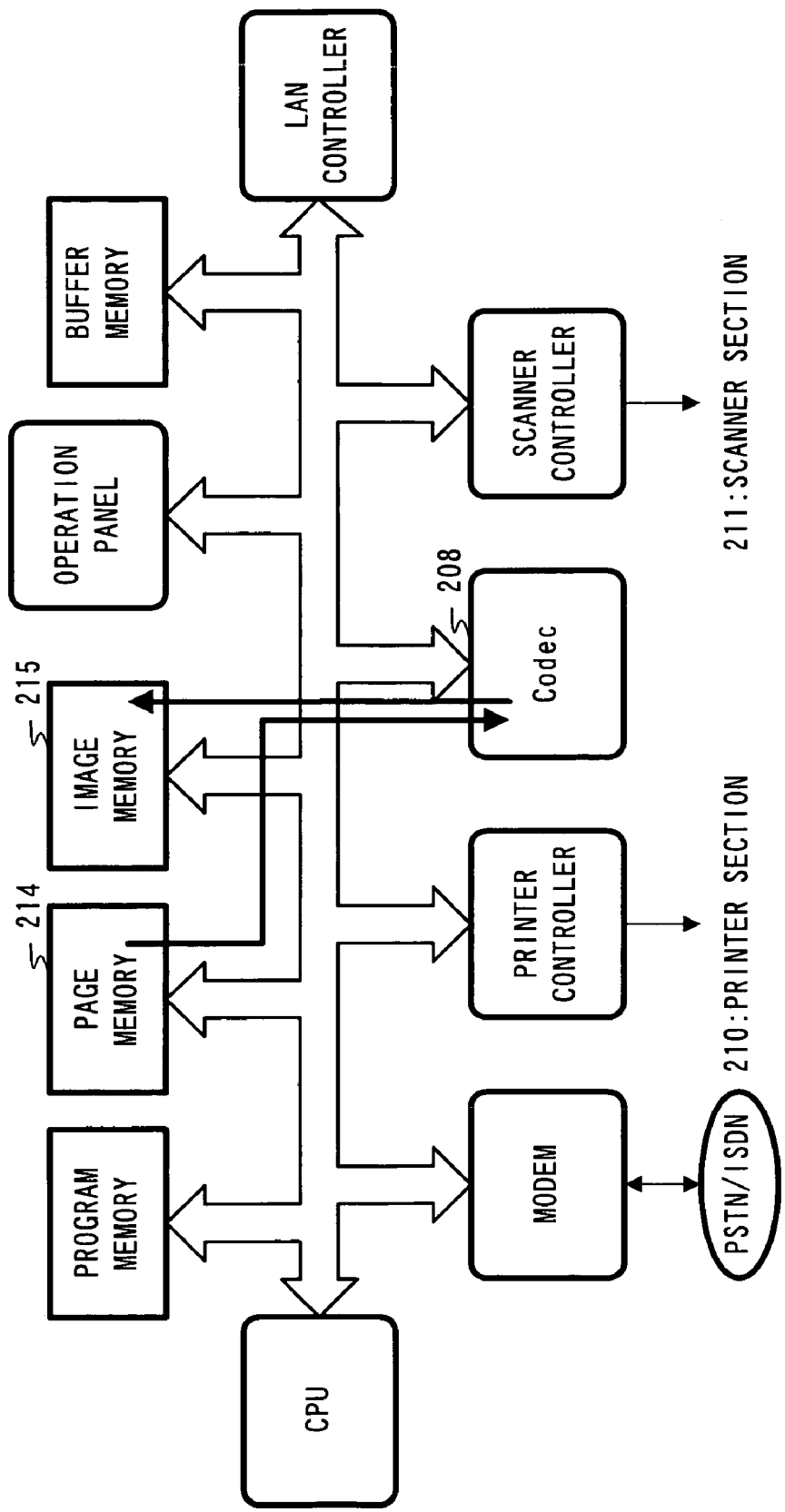
FIG. 9 illustrates a flow of image data when the multi-function apparatus according to the embodiment above carries out coding processing on image data.

FIG. 9 illustrates the flow of image data when the above image data coding process is carried out. As shown in FIG. 9, the image data written to page memory 214 is subjected to coding processing by CODEC 208, converted to coded data and written to image memory 215.

Next, the flow of multi-function apparatus 1 decoding the coded data is explained using FIG. 6. The decoding processing on the coded data is carried out when the operator enters a secret password.

When carrying out the decoding processing on the coded data, CPU 202 first decides whether any secret password has been entered from operation panel 212 (ST 601). Here, suppose a secret password has been entered from operation panel 212. If no secret password has been entered from operation panel 212, CPU 202 repeats the process in ST 601 until some password is entered.

If some secret password has been entered, CPU 202 decides whether the file corresponding to the secret password entered exists in the file control area in image memory 215 (ST 602). Here, suppose the file corresponding to the secret password exists. If the file corresponding to the secret password does not exist, CPU 202 shifts processing to ST 601 and repeats the processes in ST 601 and ST 602.

If the file corresponding to the secret password exists, CPU 202 reads the file (ST 603), then reads the coded data corresponding to the file from image memory 215 (ST 604).

After reading the coded data from image memory 215, CPU 202 subjects the coded data to a decoding process (ST 605). The decoding process for the coded data is carried out by CODEC 208 according to the JBIG system as in the case of the coding process. This restores the image data before coding.

Then, CPU 202 writes the restored image data to page memory 214 (ST 606).

After writing the image data to page memory 214, CPU 202 decides whether the image conversion process for all pages of the coded data has been completed or not (ST 607).

Then, if in ST 607, CPU 202 decides that the image conversion process for all pages of the coded data has not been completed, CPU 202 repeats the processes in ST 604 to ST 607 until the image conversion process for all pages of the coded data is completed. On the other hand, if CPU 202 decides that the image conversion process for all pages of the coded data is completed, CPU 202 carries out a printing process for the image data.

Next, the flow of multi-function apparatus 1 carrying out a printing process for the decoded image data is explained using FIG. 7. The image data printing process is carried out when all the image conversion process is completed in ST 607 or when all the image conversion process is completed in ST 410.

When carrying out the image data printing process, CPU 202 first reads the image data from page memory 214 (ST 701). Then, CPU 202 transfers the image data read to printer section 210 via printer controller 205 (ST 702).

After transferring the image data to printer section 210, CPU 202 decides whether the transfer of all pages of image data of the print data has been completed or not (ST 703). If the transfer of all pages of image data of the print data has not been completed, CPU 202 repeats the processes in ST 701 to ST 703 until the transfer of all pages of image data of the print data is completed.

On the other hand, if the transfer of all pages of image data of the print data has been completed, printer controller 205 controls printer section 210 to print the print data. At this time, CPU 202 decides whether the process in ST 506 has been shifted to a printing process in the event of memory over (ST 704).

Here, if the process in ST 506 has been shifted to a printing process in the event of memory over, CPU 202 displays a message stating that memory over has occurred on the display of operation panel 212 (ST 705).

After displaying the message stating that memory over has occurred on the display of operation panel 212, or if the process in ST 506 has not been shifted to a printing process in the event of memory over, CPU 202 deletes the file for which the printing process has been completed (ST 706) and ends the printing process for all print data.

Figure 10:
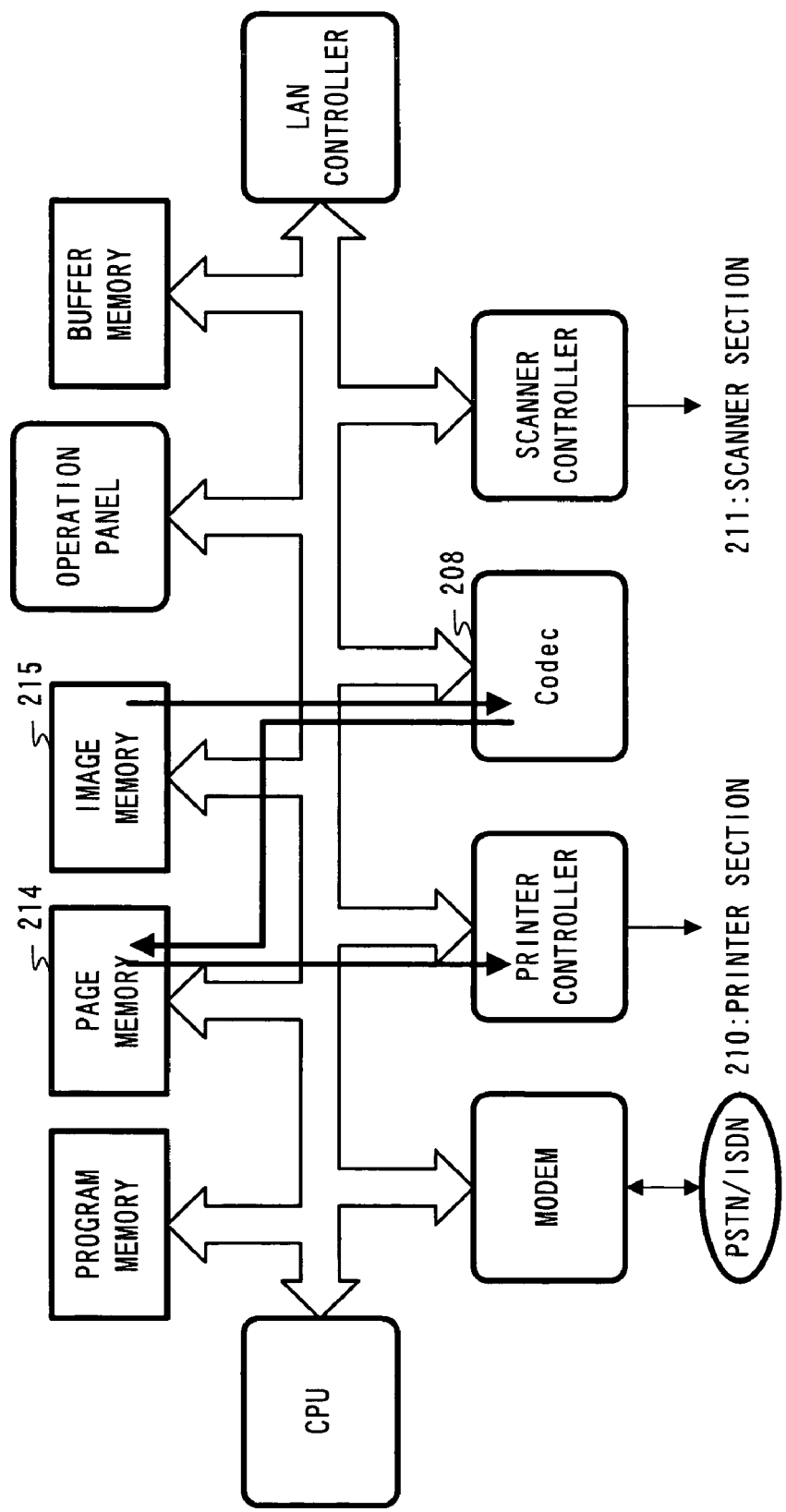
FIG. 10 illustrates a flow of decoded data and image data when the multi-function apparatus according to the embodiment above carries out decoding processing on coded data.

FIG. 10 illustrates the flow of the coded data and image data when subjecting the coded data to the above decoding process. As shown in FIG. 10, the coded data written to image memory 215 is subjected to a decoding process by CODEC 208, converted to image data and written to page memory 214. The image data written to page memory 214 is passed to printer section 210 via printer controller 205. Printer controller 205 controls printer section 210 to print the data.

Next, cases where secret printing is carried out for a document shown in FIG. 11 using a conventional printer apparatus, etc. and multi-function apparatus 1 are explained.

When carrying out secret printing for a document shown in FIG. 11, the conventional printer apparatus, etc. receives print data from a host apparatus and temporarily stores the received print data in a hard disk, etc. Then, upon the input of a secret password by the operator, the printer apparatus prints the document shown in FIG. 11.

When printing the document shown in FIG. 11, which is written in PDL data, the conventional printer apparatus, etc. prints using data written in 4 layers as shown in FIG. 12 to FIG. 15. That is, the conventional printer apparatus, etc. prints the document shown in FIG. 11 by sequentially interpreting data written in different layers such as a layer for forming characters shown in FIG. 12, a layer for forming a table shown in FIG. 13, a layer for forming marks (○ marks, etc.) shown in FIG. 14 and a layer for forming underlines shown in FIG. 15.

Here, for convenience' sake, PDL data with a four-layer structure is explained. However, some PDL data may have a structure with several tens of layers. Normally, the volume of PDL data increases with the increasing number of layers and increasing volume of data written in each layer. Therefore, it is impossible to predict the volume of the PDL data from the total number of pages of print data, etc. Therefore, the conventional printer apparatus, etc. implements secret printing by storing print data in a large-capacity hard disk, etc., having a capacity by far exceeding the data volume predicted to be printed by the operator's command.

In contrast, when carrying out secret printing of the document shown in FIG. 11, multi-function apparatus 1 receives print data from the host apparatus and decides whether image memory 215 can store the coded data of the print data or not based on its total page information, etc.

Then, if image memory 215 can store the coded data, multi-function apparatus 1 subjects the print data to a coding process according to the JBIG system. Then, the coded data is stored in image memory 215. Therefore, for the coded data stored in image memory 215, a compression rate of a certain value or more can be expected irrespective of the layered structure of the PDL data of the print data and it is possible to predict the data volume after compression. This makes it possible to store the print data sent from the host apparatus in the apparatus without requiring bulk memory and implement secret printing.

In this way, when carrying out secret printing, the multi-function apparatus of this embodiment predicts the data volume of coded image data of the received print data and decides whether image memory 215 has a free space enough to store the data volume. Then, if image memory 215 has a free space enough to store the data volume, the multi-function apparatus stores the coded data of the print data in image memory 215. Then, when the operator inputs a secret password, the multi-function apparatus decodes and prints the coded data.

At this time, the coded data stored in image memory 215 is the data coded according to the coding/decoding system that can predict a minimum compression rate, such as a JBIG system. Therefore, since it is possible to predict the data volume corresponding to a minimum compression rate when carrying out coding processing, the multi-function apparatus can store image data of the print data in image memory 215 without requiring a large-capacity hard disk, etc.

Moreover, image memory 215 that stores coded data is a memory used for normal facsimile communication operation or copy operation by multi-function apparatus 1. Therefore, it is possible to implement secret printing without providing an additional large-capacity memory. Furthermore, eliminating the need for provision of an additional large-capacity memory, etc. prevents high apparatus costs.

Furthermore, when storing print data in multi-function apparatus 1, a volume of coded data is predicted based on total page information of print data, size of recording sheets for printing and corresponding minimum compression rate. This ensures the storage of coded data of print data in image memory 215.

On the other hand, if it is not possible to store data in image memory 215, multi-function apparatus 1 displays a message stating that the operator should carry out split printing, urging the next processing when it is impossible to print all print data for secret printing.

This embodiment describes a case of secret printing where print data sent from the host apparatus is stored in memory of the apparatus. However, the present invention is not limited to cases where secret printing is carried out but is applicable to any cases where print data sent from the host apparatus needs to be stored in memory of the apparatus.

For example, if a plurality of PCs is connected on a network, the present invention is also applicable to a case where instructions for data printing are received from a plurality of PCs at a time. In this case, it is possible to encode the print data that exceeds the printing capacity and store the coded data in memory and decode the coded data and print at a timing at which it is possible to carry out printing processing.

The present invention is also applicable to a case where print data is stored in memory of the apparatus when there is no recording sheet to print the print data. In this case, it is possible to encode the print data that cannot be printed and store the coded data in memory, and decode the coded data and print when recording sheets are supplied.

Furthermore, this embodiment describes a multi-function apparatus. However, the present invention is not limited to a multi-function apparatus, but is applicable to any apparatus that has at least a printer function.

Moreover, this embodiment describes a case where coded data is stored in image memory, which stores image data received through the facsimile function of the multi-function apparatus. However, the present invention is not limited to this, but the coded data can also be stored in other memory. Thus, even if the coded data is stored in the other memory, since the data stored is coded data, the present invention has an effect of reducing the volume of memory.

As described above, when carrying out secret printing, etc. the printing apparatus according to the present invention encodes print data received from a host apparatus and stores the coded data in memory, making it possible to store the print data sent from the host apparatus in the printing apparatus without requiring bulk memory.

The present invention is not limited to the above described embodiments, and various variations and modifications may be possible without departing from the scope of the present invention.

This application is based on the Japanese Patent Application No. 2000-041742 filed on Feb. 18, 2000, entire content of which is expressly incorporated by reference herein.

What is claimed is:

1. A multifunction apparatus comprising:
    a facsimile communication section configured to conduct a facsimile communication;
    an interface configured to receive PDL data from a host apparatus;
    a controller configured to obtain image data based on the received PDL data;
    a compressor configured to compress the obtained image data by a compression method utilized for the facsimile communication;
    a memory configured to store the compressed image data; and
    a printer configured to print the image data stored in the memory:
    the controller being further configured to:
        predict an amount of the obtained image data compressed by the compression method utilized for the facsimile communication, based on at least a size of a recording paper and a predetermined compression rate utilized in the compression method, before storing the compressed image data in the memory;
        judge whether the predicted amount of the compressed image data can be stored in the memory; and
        store the compressed image data in the memory when the predicted amount of the compressed image data can be stored in the memory.

2. The multifunction apparatus according to claim 1, wherein the controller displays an error message when the controller judges that the predicted amount of the compressed image data can not be stored in the memory.

3. The multifunction apparatus according to claim 2, wherein the error message indicates that the received data should be divided into smaller pieces.

4. The multifunction apparatus according to claim 1, wherein the compressor compresses the image data with a minimum compression rate when the controller predicts the amount of the compressed image data.

5. The multifunction apparatus according to claim 1, wherein the compression method comprises at least one of a JBIG system and a MH system.

6. The multifunction apparatus according to claim 1, wherein the controller predicts the amount of the image data compressed by the compression method when the received PDL data are not immediately printed.

7. The multifunction apparatus according to claim 1, wherein the controller predicts the amount of the image data compressed by the compression method when a plurality of sets of the PDL data are received.

8. The multifunction apparatus according to claim 1, wherein the controller predicts the amount of the image data compressed by the compression method when a printing medium is not set in the multifunction apparatus.

9. A multifunction apparatus having a secret printing function, the secret printing function prohibiting image data from being printed until a predetermined password is input, the multifunction apparatus comprising:
   a facsimile communication section configured to conduct a facsimile communication;
   an interface configured to receive PDL data from a host apparatus,
   a controller configured to obtain image data based on the received PDL data;
   a compressor configured to compress the obtained image data by a compression method in the facsimile function;
   a memory configured to store the compressed image data; and
   a printer configured to print the image data stored in the memory;
   the controller being further configured to:
      judge whether the received PDL data includes an instruction of secret printing;
      predict an amount of the obtained image data compressed by the compression method utilized for the facsimile communication, based on at least a size of a recording paper and a predetermined compression rate utilized in the compression method, before storing the compressed image data in the memory when the received PDL data includes the instruction of the secret printing;
      judge whether the predicted amount of the compressed image data can be stored in the memory; and
      store the compressed image data in the memory when the predicted amount of the compressed image data can be stored in the memory.

10. A data printing method utilized in a multifunction apparatus, the multifunction apparatus having a facsimile communication section, the facsimile communication section conducting a facsimile communication, the data printing method comprising:
   receiving PDL data from a host apparatus;
   obtaining image data based on the received PDL data;
   compressing the obtained image data by a compression method utilized for the facsimile communication;
   predict an amount of the obtained image data compressed by the compression method utilized for the facsimile communication, based on at least a size of a recording paper and a predetermined compression rate utilized in the compression method, before storing the compressed image data in a memory;
   judging whether the predicted amount of the compressed image data can be stored in the memory;
   storing the compressed image data in the memory when the predicted amount of the compressed image data can be stored in the memory; and
   printing the stored image data.

* * * * *